J. BREWER.
Wheel-Cultivator.
No. 49,075.
Patented Aug. 1, 1865.
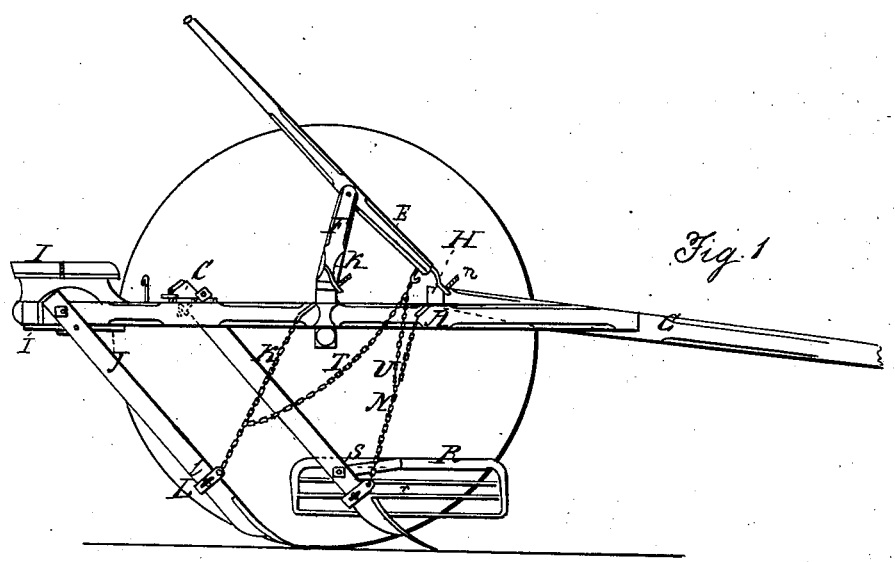
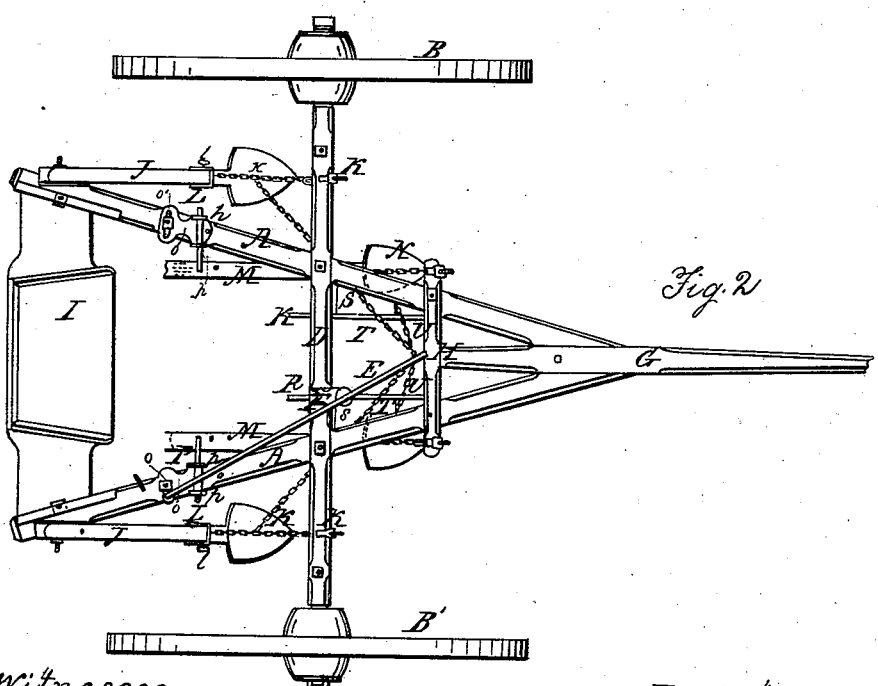

UNITED STATES PATENT OFFICE.

JAMES BREWER, OF ALBANY, ILLINOIS.

IMPROVEMENT IN CULTIVATORS.

Specification forming part of Letters Patent No. 49,075, dated August 1, 1865.

*To all whom it may concern:*

Be it known that I, JAMES BREWER, of Albany, in the county of Whiteside and State of Illinois, have invented a new and useful Improvement in Cultivators, of which the following is a full, clear, and exact description, reference being had to the accompanying drawings, which make part of this specification, and in which—

Figure 1 represents a view in elevation of one side of my improved cultivator with the rear wheel removed, and Fig. 2 a plan or top view of the same.

It is the object of my invention to produce a cheap, simple, and efficient machine for cultivating crops of various heights, even when planted in irregular rows.

In the accompanying drawings, which show a convenient arrangement of parts for carrying out the objects of my invention, a wedge-shaped frame, A, is shown as mounted on two wheels, B B', which turn on independent axles C, secured to the under side of the frame, their inner ends being secured to the side pieces, A, thus leaving the space between the side pieces clear. The main cross-piece D extends across the top of the frame, and is firmly fastened both to it and to the axles C. The lifting-lever E is pivoted to play vertically in a standard, F, on this cross-piece. The tongue G is inserted between the side pieces, A, and its rear end secured to a cross-bar, H, also bolted to the top of the frame.

The seat I for the driver is mounted on the rear cross-beam of the frame, which is bolted to the side timbers by through bolts and nuts $i$, by which means it can be attached to either the upper or under side of the frame, and thus be set higher or lower, as required. The seat is shown in black lines in the drawings as attached beneath the frame, and in red lines in Fig. 1 as secured upon the upper side thereof.

The outer plow-standards, J, are pivoted to play vertically on the rear outer corner of the frame. Their drag-chains K are attached at their lower ends to collars L, which slide up and down on the standards or plow-legs, and can be adjusted to any desired height by set-screws $l$. The upper ends of the drag-chains are attached to tension-screws $k$, passing through the main cross-piece D. By these devices the plows can readily be raised or lowered by slackening or tightening the drag-chains.

The inner or front plows, M, are attached to the front cross-piece, H, by their drag-chains N, in a manner similar to that of the outer plows, but are connected with the frame in a different way.

Upon each side of the frame a bracket, O, is pivoted to turn horizontally on a pin, $o$, and having a curved slot, $o'$, at its rear end, embracing a set-screw, $o^2$. Crank-arms P are mounted in lugs $p$ on the bracket O, and turn axially therein. The bent-down portion of the crank-arms pass through the upper parts of the plow-legs M, which play freely laterally on them, while the crank-arms turn vertically in the brackets, which, in turn, can be set at any necessary angle by turning on their pivots, by which means I am enabled to set the shovels at any desired angle to throw the earth upon or from the plants, and at the same time to allow the shovels both vertical and lateral play.

The shields or corn-guards R, consisting of frames containing parallel and horizontal bars $r$, are secured to stirrups S, for the feet of the driver, connected to the plow-standards by sliding collars and set-screws, in the manner shown for attaching the drag-chains, or in some other way which will permit them to be raised and lowered to suit the crop, and to correspond with the adjustment of the driver's seat. The shields protect the plants from stones, sticks, and large clods, permitting the pulverized earth only to pass through.

The plows are raised and lowered or held out of the ground when moving from place to place by lifting-chains T U, connected to the drag-chains and to the lifting-lever E, which is operated by the driver from his seat. A stop, $e$, on the frame holds the lever down and the plows up when desired.

It will be observed that the front plows are the same distance in front of the axle that the rear ones are behind it. The parts are so balanced that the weight of the driver in his seat counterbalances that of the tongue and the draft of the front plows.

When plowing the parts occupy the position shown in Fig. 1 of the drawings. The driver sits in his seat with his feet in the stirrups R, and shifts the plows laterally with his feet as occasion requires, and lifts them, when necessary, by the lever E. When the plows are set at an angle to throw the earth to or from the rows, they have a tendency to run in or out, according to the way in which they are set. This I counteract by setting the tension-screws $n$ in or out by means of a series of holes in the cross-bar H, or by a slot and set-screw.

When the driver's seat is secured upon the upper side of the frame, I prefer to pivot it at one end, so as to turn horizontally, and to have a hole in the other, in which a projecting pin, $i$, fits. The seat is thus held firmly while the driver is upon it. When he wishes to mount his seat, by slightly lifting it at one end he can turn it on its pivot, go inside the frame, return the seat to its place, and then mount more easily than from the outside.

What I claim as my invention, and desire to secure by Letters Patent of the United States, is—

1. The combination of the corn-guards R, the stirrups, and the swiveling standards S with the frame, when arranged and operating as described.

2. The combination of the swiveling front plows and the frame with the adjustable sliding collars, the drag-chains, the lifting-chains, the tension-screws, and the tilting-lever, when constructed, arranged, and operating as described.

3. The combination of the plow standards and frame with the adjusting-bracket O and swiveling or crank hinge P, when constructed, arranged, and operating as described, for the purpose of varying the angle of the plow to the furrow while allowing the plows both vertical and lateral play, as set forth.

4. The combination of the triangular frame, the adjustable driver's seat, the lifting-lever, the outer plows, the adjustable inner plows, the shields, the stirrups, and the lifting-chains, when arranged and operating substantially in the manner and for the purpose described.

In testimony whereof I have hereunto subscribed my name.

JAMES BREWER.

Witnesses:
WM. D. BALDWIN,
J. I. PEYTON.